(No Model.)
A. HEYDRICH.
ADJUSTABLE INTERIOR CALIPERS.
No. 339,410. Patented Apr. 6, 1886.
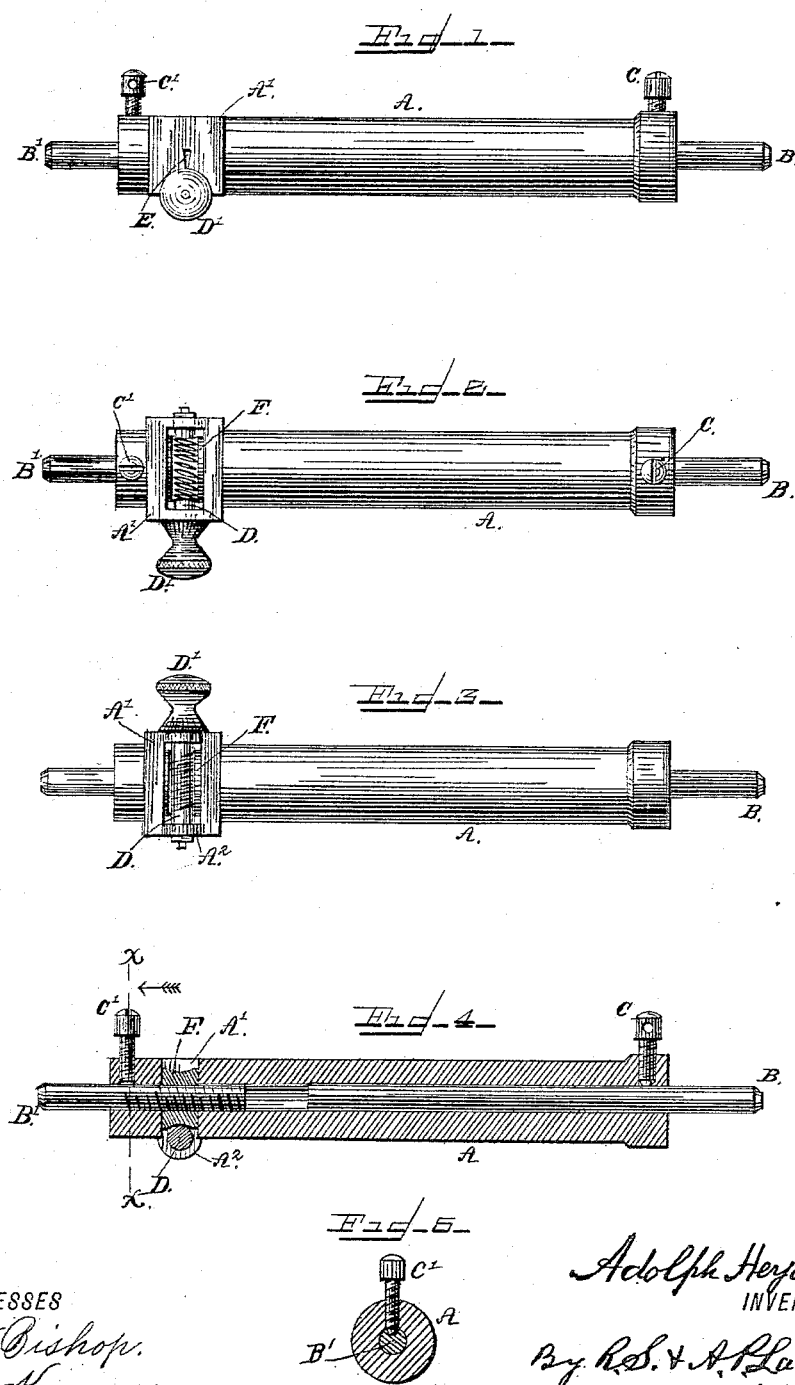

UNITED STATES PATENT OFFICE.

ADOLPH HEYDRICH, OF TOPEKA, KANSAS.

ADJUSTABLE INTERIOR-CALIPERS.

SPECIFICATION forming part of Letters Patent No. 339,410, dated April 6, 1886.

Application filed August 6, 1885. Serial No. 173,763. (No model.)

*To all whom it may concern:*

Be it known that I, ADOLPH HEYDRICH, a subject of the Emperor of Germany, but having declared my intention to become a citizen of the United States, residing at Topeka, in the county of Shawnee and State of Kansas, have invented certain new and useful Improvements in Adjustable Interior-Calipers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in calipers for measuring interior diameters of cylinders; and it has for its object to provide calipers which will be compact in form and accurate in their operation.

It consists, essentially, of a tube, in which the distance-pins are placed, provided with means for securing the pins and mechanism for operating the same, all of which will be fully explained, and specifically pointed out in the claims.

In the annexed drawings, Figure 1 is a side view of my improved calipers. Figs. 2 and 3 are top and bottom plan views, respectively, of the same. Fig. 4 is a vertical longitudinal section; and Fig. 5 is a vertical cross-section on the line X X, Fig. 4, looking in the direction indicated by the arrow.

Referring to the drawings, A is the distance-pin-holding tube, and B B' are the distance-pins. These distance-pins are made of different lengths, as shown, and the longer pin, B, has a smooth surface throughout its length, while the shorter pin, B', is screw-threaded through a portion of its length.

Set-screws C C' are placed in each end of the tube A, as shown, and bear against the distance-pins, securing them in any position to which they may be adjusted.

Near that end of the tube A through which the screw-threaded pin B' works I form the hollow rectangular enlargement A', provided on its under side with suitable bearings, A², in which I journal the worm-screw D. This worm-screw has formed on one end an operating-knob, D', which is provided around its base with a graduated scale, as clearly shown in Figs. 2 and 3. An indicator-notch, E, is formed on the side of the enlargement A', and registers with the graduated scale on the knob D' in the operation of the device. Where so desired a pointer can be substituted for the notch E; but I prefer the notch E, as equally good results are obtained from its use, and it presents a less awkward appearance than the pointer would. The worm-screw D meshes with an adjusting-wheel, F, placed on the pin B' and supported thereby. The adjusting-wheel F is provided with internal screw-threads, which mesh with the threads on the pin B', and its circumference is provided with a series of notches, so formed and arranged that when the worm-screw D is turned it will cause the wheel E to revolve by the action of the worm-screw threads against the said notches.

In operation the pins B B' are adjusted to the approximate inner diameter of the pipe or cylinder to be measured, and the pin B secured by tightening the set-screw C. The knob D is then turned until the pin B' measures the exact diameter sought. The set-screw C' is then tightened, securing the pin B' and the calipers withdrawn. If, however, there be an internal flange around the mouth of the pipe, it is noted what point of the scale on the knob D' registers with the notch E, and the worm-screw turned back until the pin B' has been withdrawn far enough to allow the instrument to be taken from the pipe, after which the knob D' can be turned in its original direction until the diameter required is again noted, when the set-screw C' can be tightened and the pin B' secured.

To prevent the pin B' turning with the adjusting-wheel, I form a groove along its upper side, in which the set-screw C' rests, as shown in Fig. 5. Thus it will be seen, if the pin B' commences to revolve, the sides of the groove will strike against the pin C', and the revolution of the pin will be stopped at once.

The advantages of my device will be readily appreciated. It is simple in construction, and the parts are not only few in number, but are arranged in a very compact form.

Having thus described my invention, what I claim, and desire to secure by Letters Patent, is—

1. Calipers consisting of a tube, distance-pins held in the tube and secured by set-screws, one of the pins being screw-threaded, and mechanism, substantially as described, for adjusting the screw-threaded pin, as and for the purposes set forth.

2. The combination, in calipers, of a tube provided with a hollow enlargement near one end, a worm-screw journaled in the under side of the enlargement, an adjusting-wheel held in engagement with the worm-screw, and the screw-threaded distance-pin inserted through and supporting the adjusting-wheel, substantially as and for the purposes specified.

3. The combination of the tube provided near one end with a hollow enlargement, a worm-screw journaled in the under side of the enlargement, and adjusting-wheel held in engagement with the worm-screw, the screw-threaded distance-pin inserted through and supporting the adjusting-wheel, the operating-knob formed on the end of the worm-screw, provided with a graduated scale around its base, and the side of the hollow enlargement provided with an index-notch, substantially as specified.

In testimony whereof I affix my signature in the presence of two witnesses.

ADOLPH HEYDRICH.

Witnesses:
JOSEPH GERDOM,
HARRY DERICKSON.